(12) United States Patent
Prissok et al.

(10) Patent No.: US 9,097,835 B2
(45) Date of Patent: Aug. 4, 2015

(54) LIGHT GUIDES MADE OF THERMOPLASTIC POLYURETHANES

(75) Inventors: Frank Prissok, Lemfoerde (DE); Joern Duwenhorst, Lemfoerde (DE); Oliver Steffen Henze, Damme (DE); Oliver Muehren, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/142,759

(22) PCT Filed: Dec. 16, 2009

(86) PCT No.: PCT/EP2009/067308
§ 371 (c)(1),
(2), (4) Date: Jun. 29, 2011

(87) PCT Pub. No.: WO2010/076224
PCT Pub. Date: Jul. 8, 2010

(65) Prior Publication Data
US 2011/0275779 A1    Nov. 10, 2011

(30) Foreign Application Priority Data

Dec. 29, 2008   (EP) .................... 08173022

(51) Int. Cl.
| G02F 1/03 | (2006.01) |
|---|---|
| G02B 6/02 | (2006.01) |
| C08G 18/66 | (2006.01) |
| C08G 18/08 | (2006.01) |
| C08G 18/32 | (2006.01) |
| C08G 18/42 | (2006.01) |
| C08G 18/48 | (2006.01) |
| C08G 18/75 | (2006.01) |
| C08G 18/76 | (2006.01) |
| G02B 1/04 | (2006.01) |

(52) U.S. Cl.
CPC ........ *G02B 6/02033* (2013.01); *C08G 18/0895* (2013.01); *C08G 18/3206* (2013.01); *C08G 18/4238* (2013.01); *C08G 18/4854* (2013.01); *C08G 18/6603* (2013.01); *C08G 18/664* (2013.01); *C08G 18/667* (2013.01); *C08G 18/6674* (2013.01); *C08G 18/758* (2013.01); *C08G 18/7671* (2013.01); *G02B 1/045* (2013.01); *G02B 6/02038* (2013.01)

(58) Field of Classification Search
CPC ............. C08G 18/6674; C08G 18/667; C08G 18/6603; C08G 18/3206; C08G 18/4854; C08G 18/6506; G02B 6/02033; G02B 6/02038
USPC .................................................. 528/65, 76, 85
See application file for complete search history.

(56) References Cited

U.S. PATENT DOCUMENTS

| 3,620,905 | A | * | 11/1971 | Ahramjian | ................. 428/425.6 |
|---|---|---|---|---|---|
| 4,447,590 | A | * | 5/1984 | Szycher | .......................... 528/76 |
| 4,621,113 | A | | 11/1986 | Collins | |
| 4,836,646 | A | | 6/1989 | Parker et al. | |
| 4,915,473 | A | * | 4/1990 | Haese et al. | .................... 385/13 |
| 5,374,704 | A | * | 12/1994 | Muller et al. | ................... 528/66 |
| 6,562,932 | B1 | * | 5/2003 | Markusch et al. | .............. 528/58 |
| 2002/0068809 | A1 | | 6/2002 | Tamura et al. | |
| 2008/0117639 | A1 | | 5/2008 | Chen | |
| 2009/0312515 | A1 | | 12/2009 | Uchida et al. | |

FOREIGN PATENT DOCUMENTS

| EP | 0 603 675 A1 | 6/1994 |
|---|---|---|
| EP | 1 090 940 A2 | 4/2001 |
| EP | 1 197 505 | 4/2002 |
| EP | 1 302 491 A1 | 4/2003 |
| EP | 2 036 933 | 3/2009 |
| JP | 01-160618 A | 6/1989 |
| JP | 6-228265 | 8/1994 |
| JP | 07-179558 A | 7/1995 |
| JP | 2005-275019 A | 10/2005 |
| WO | 94 09048 | 4/1994 |

OTHER PUBLICATIONS

International Search Report issued Feb. 11, 2010 in PCT/EP09/067308 filed Dec. 16, 2009.

* cited by examiner

*Primary Examiner* — Michael L Leonard
(74) *Attorney, Agent, or Firm* — Oblon, McClelland, Maier & Neustadt, L.L.P.

(57) ABSTRACT

The invention relates to thermoplastic polyurethanes (hereinafter TPUs) suitable for the production of optical conductors, to a process for their production, and also to optical conductors based on TPUs.

11 Claims, No Drawings

LIGHT GUIDES MADE OF THERMOPLASTIC POLYURETHANES

The invention relates to thermoplastic polyurethanes (hereinafter TPUs) suitable for the production of optical conductors, to a process for their production, and also to optical conductors based on TPUs.

It is known that optical wave guides can be used to transmit large amounts of data, and that this data transmission is free from disruption, i.e. cannot be affected by electromagnetic fields. There are known optical conductors composed of glass fibers, but there are also known optical conductors composed of plastic. The latter are in particular known from the mechanical engineering sector, the automobile construction sector, and the office sector. Optical conductors of this type, also termed "polymeric optical fibers", can have an optical core composed of the polymer transmitting light, an optical cladding material, and a protective sheath. Examples of main polymers used industrially are polymethyl methacrylate for the core and fluoropolymers, such as polyvinylidene fluoride or polytetrafluoroethylene, for the cladding material.

US-A-4 836 646 has disclosed the use of specific protective layers ("cladding"), and with regard to the optical core here a general reference is made to polystyrene, polymethyl methacrylate, polycarbonate, polyurethane, or copolymers of styrene and methyl methacrylate, styrene and methyl acrylate, methyl methacrylate and ethyl acrylate, styrene and alpha-methylstyrene, or styrene and vinyltoluene. US 2008/0117639 A1 discloses optically conductive sheets with a light-condensing effect, which alter the light during its passage. The plastics used for this purpose are intended to be TPU, PC, silicones, PMMA, or PET.

WO 94/09048 A1 has disclosed glass-like, crosslinked polyurethanes and polyurethane networks, and these can be used for biomedical applications, an example being optical fibers. The intention here is that the hydroxy groups and the isocyanate groups are used stoichiometrically and that the polyols are of low molecular weight.

However, the known optical-conductor materials based on plastics which are flexible, elastic, and highly transparent do not reliably provide adequate light transmission for transmitter/receiver equipment at lengths greater than 3 m. Furthermore, optically conductive plastics such as polymethyl methacrylate are too stiff and brittle for flexible connections, and mineral optical conductors using glass fibers are unsuitable for narrow bending radii. The known optical conductors have excessive absorption losses and/or inadequate mechanical properties.

It is an object of the invention to provide improved optical conductors which are flexible, elastic, and highly transparent, and which reliably provide adequate light transmission even when lengths are relatively high.

The invention provides an optically conductive thermoplastic polyurethane, obtainable from
A) at least one diisocyanate
B) at least one polyol
C) at least one isocyanate-reactive chain extender, wherein, in the thermoplastic polyurethane,
a) the content of aromatics and of conjugated π-electron systems is at most 40% by weight, preferably at most 25% by weight, particularly preferably at most 10% by weight, based on the thermoplastic polyurethane inclusive of any additives present,
b) the refractive index of the thermoplastic polyurethane is at least 1.50, preferably at least 1.52, and
c) total opacity is smaller than 10%, preferably smaller than 7%.

The content of aromatics and conjugated π-electron systems in a) is based on the weight of the aromatics (without hydrogen H), unsaturated carbon atoms, and heteroatoms which are part of the π-electron system, but excluding oxygen atoms here.

The refractive index is determined at a temperature of 20° C., and total opacity is preferably determined by the methods stated in the examples. It is preferable to measure the refractive index on a test specimen which has a uniform layer thickness of 2 mm which has been produced by pouring the liquid optically conductive thermoplastic polyurethane onto a flat, horizontally oriented smooth surface which is also termed hereinafter an injection-molded sheet. Test specimens of suitable size are then punched out of, or cut out of, this cast sheet.

The invention further provides the use of the TPUs of the invention as optically conductive element in optical conductors, in particular in fibers.

The invention further provides a process for the production of optical conductors, which comprises using a TPU of the invention as optically conductive material, in particular in fibers and tubing.

The invention further provides a process for the production of TPUs of the invention, which comprises reacting at least one organic diisocyanate A), at least one preferably linear hydroxy-terminated polyol B, and at least one short-chain chain extender based on a diol, which comprises
using an equivalence ratio of NCO groups to the entirety of the isocyanate-reactive groups of from 0.9:1.0 to 1.2:1.0, preferably from 0.95:1.0 to 1.10:1.0
introducing no scattering centers
and introducing no, or in essence no, additions which absorb UV radiation and/or VIS radiation.

Further embodiments of the present invention can be found in the claims, in the description, and in the examples. It is, of course, possible to use the above-mentioned features of the article/processes/uses of the invention not only in the respective stated combination but also in other combinations, without exceeding the scope of the invention, and the same applies to the inventive features described below.

Thermoplastic polyurethanes TPUs are polyurethanes which, within a certain temperature range, can be repeatedly softened by heating and harden on cooling, and, in the softened state, can be repeatedly molded via casting in the form of a molded part, extrudate, or formed part, to give a semifinished product or to give articles. The TPUs are block copolymers; these have hard and soft segments within a molecule. In one preferred embodiment, the proportion of the hard phase, based on the entire TPU, is preferably from 15 to 65% by weight, in particular from 40 to 65% by weight, in the case of aliphatic TPU, where the proportion of the hard phase is defined via the following formula:

$$\text{Proportion of hard phase} = \left\{ \sum_{x=1}^{k} [(m_{CEx}/M_{CEx})^* M_{iso} + m_{CEx}] \right\} / m_{tot}$$

where the definitions are as follows:
$M_{CEx}$: molar mass of chain extender x in g/mol
$M_{CEx}$: mass of chain extender x in g
$M_{iso}$: molar mass of isocyanate used in g/mol
$m_{tot}$: total mass of all of the starting materials in g
k: number of chain extenders.

It is moreover preferable to avoid use of any additives which, in the range of about 280 to 800 nm, have the type of significant absorption or scattering generated by scattering centers.

"No significant absorption" means in the context of this invention that the transmittance of a 2 mm injection-molded sheet in the range of 280 nm to 800 nm is greater than 80%, preferably greater than 85%, more preferably greater than 90%, and particularly preferably greater than 95%.

In the context of this invention, a scattering center is any particle which causes scattering of light at the wavelength used perpendicularly to the direction of incidence. Light scattering occurs as a function of the wavelength of the light incident on the transparent TPU if the maximum dimension of the scattering centers is 4/2, preferably 1/1, more preferably 1/2, particularly preferably 1/4, of the wavelength of the light used.

Accordingly, particles termed scattering centers are those which have a longest spatial dimension smaller than 4/2, preferably 1/1, more preferably 1/2, particularly preferably 1/4, of the wavelength of the light incident on the optical conductor.

Scattering centers are very particularly preferably particles of which the spatial dimension of the largest diameter is more than 0.7 μm, preferably more than 0.6 μm, particularly preferably more than 0.5 μm.

Production of the thermoplastic polyurethanes in the invention uses reaction of isocyanate A with polyol B and optionally with further compounds reactive toward isocyanates, and with chain extenders C optionally in the presence of catalysts D and/or of conventional auxiliaries E.

The components A, B, C, and also optionally D and/or E usually used in the production of the polyurethanes will be described below by way of example:

a) the organic isocyanates A used can comprise well-known aromatic, aliphatic, cycloaliphatic, and/or araliphatic isocyanates, preferably diisocyanates, examples being diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate, tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1-isocyanato-4-[(4-isocyanatocyclohexyl)methyl]cyclohexane (H12MDI), 2,6-diisocyanato-hexanecarboxylic ester, 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'-, and 2,2'-diisocyanate, preferably diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), hexamethylene diisocyanate, 1-isocyanato-4-[(4-isocyanatocyclohexyl)methyl]-cyclohexane, and/or IPDI.

Particularly preferred isocyanates are aliphatic isocyanates, e.g. hexamethylene diisocyanate and in particular H12MDI.

b) Compounds (b) used which are reactive toward isocyanates can comprise well-known compounds reactive toward isocyanates, examples being polyesterols, polyetherols, and/or polycarbonatediols, for which the collective term "polyols" is also usually used, with number-average molar masses (Mn) from 500 g/mol to 8000 g/mol, preferably from 600 g/mol to 6000 g/mol, in particular from 800 g/mol to less than 3000 g/mol, and preferably with average functionality of from 1.8 to 2.3 with respect to isocyanates, preferably from 1.9 to 2.2, in particular 2.

It is preferable to use polyether polyols, examples being those based on well-known starter substances and on conventional alkylene oxides, such as ethylene oxide, propylene oxide, and/or butylene oxide, preference being given to polyetherols based on propylene 1,2-oxide and ethylene oxide, and in particular polyoxytetramethylene glycols. The polyetherols used can also comprise what are known as low-unsaturation polyetherols. For the purposes of this invention, low-unsaturation polyols are in particular polyether alcohols having less than 0.02 meq/g content of unsaturated compounds, preferably less than 0.01 meq/g. Polyether alcohols of this type are mostly produced via an addition reaction of alkylene oxides, in particular ethylene oxide, propylene oxide and mixtures thereof, onto the above-described diols or triols in the presence of high-activity catalysts.

Examples of high-activity catalysts of this type are cesium hydroxide and multimetal cyanide catalysts, also termed DMC catalysts. A DMC catalyst often used is zinc hexacyanocobaltate. The DMC catalyst can be left in the polyether alcohol after the reaction, but is usually removed, for example via sedimentation or filtration.

Instead of a polyol, it is also possible to use a mixture of various polyols. It is particularly preferable that the thermoplastic polyurethane of the invention is based on polytetrahydrofuran with a number-average molar mass (Mn) of from 600 g/mol to 2000 g/mol, preferably from 800 g/mol to 1400 g/mol, particularly preferably from 950 g/mol to 1050 g/mol, as component (b).

c) The chain extender C used can comprise well-known aliphatic, araliphatic, aromatic, and/or cycloaliphatic compounds with a number-average molar mass of from 50 g/mol to 499 g/mol, preferably difunctional compounds, examples being alkanediols having from 2 to 10 carbon atoms in the alkylene radical, preferably 1,4-butanediol, 1,6-hexanediol, and/or di-, tri-, tetra-, penta-, hexa-, hepta-, octa-, nona-, and/or decaalkylene glycols having from 3 to 8 carbon atoms, preferably unbranched alkanediols, in particular 1,3-propanediol and 1,4-butanediol.

d) Suitable catalysts D which in particular accelerate the reaction between the NCO groups of the diisocyanates A and component B are the tertiary amines which are conventional and known from the prior art, examples being triethylamine, dimethylcyclohexylamine, N-methylmorpholine, N,N'-dimethylpiperazine, 2-(dimethylaminoethoxy)ethanol, diazabicycio[2.2.2]octane, and the like, and also in particular organometallic compounds, such as titanic esters, iron compounds, preferably iron(III) acetylacetonate, tin compounds, preferably stannous diacetate, stannous dioctoate, stannous dilaurate, or, in another preferred embodiment, the dialkyltin salts of aliphatic carboxylic acids, more preferably dibutyltin diacetate, dibutyltin dilaurate, or the like. The amounts usually used of the catalysts are from 0.00001 to 0.1 part by weight per 100 parts by weight of polyhydroxy compound (b).

e) It is also possible to add conventional auxiliaries E, alongside catalysts D, to the structural components A to C. Examples that may be mentioned are blowing agents, surfactants, flame retardants, nucleating agents, lubricants and mold-release agents, dyes, and pigments, stabilizers, e.g. for protection from hydrolysis, light, heat, or discoloration, inorganic and/or organic fillers, reinforcing agents, plasticizers, and metal deactivators. Preferred hydrolysis stabilizers used are oligomeric and/or polymeric aliphatic or aromatic carbodiimides.

However, one preferred embodiment uses only an amount which is preferably at most 1% by weight of auxiliaries of this type, in particular at most 0.1% by weight, based on the total weight of the thermoplastic polyurethane inclusive of the additives. One particularly preferred embodiment uses none of said auxiliaries.

Particular preference is given to TPUs based on hydrogenated MDI and on at least one polyetherol with a maximum proportion of 25% by weight, preferably at most 10% by weight, of aromatics and conjugated π-electron systems, based on the thermoplastic polyurethane inclusive of any additives present, in particular TPU excluding aromatic compounds.

"Excluding aromatic compounds" means that, in the range of light wavelengths from 0.25 μm to 0.35 μm, the transmittance of a test specimen made from an injection-molded sheet of thickness 2 mm is more than 30%, more preferably more than 50%, and particularly preferably more than 70%.

The TPUs can be produced by the known processes, batchwise or continuously, for example using reactive extruders or the belt process, in the one-shot or prepolymer process, preferably in the one-shot process. In these processes, the reacting components A, B, and optionally C, D, and/or E can be mixed in succession or simultaneously with one another, whereupon the reaction immediately begins. In the extruder process, structural components A, B, and also optionally C, D, and/or E are introduced individually or in the form of a mixture into the extruder, and preferably reacted at temperatures of from 100° C. to 280° C., more preferably from 140° C. to 250° C., and the resultant thermoplastic polyurethane is extruded, cooled and pelletized.

In order to optimize the TPUs, the polyol component B and chain extender C can be varied. One preferred embodiment sets a ratio by weight of from 20 to 2, in particular from 8 to 3, for polyol B to the entirety of chain extenders C to be used.

In one preferred embodiment, the reaction of the isocyanate A with the isocyanate-reactive components takes place at an index of from 950 to 1050, particularly preferably from 970 to 1010, and in particular from 980 to 1000. The index here is defined via the ratio of the entirety of the isocyanate groups used during the reaction in component A to the isocyanate-reactive groups, i.e. in particular groups B and C. If the index is 1000, there is one active hydrogen atom for each isocyanate group of component A. If the index is above 1000, there are more isocyanate groups than OH groups.

The optically conductive TPUs of the invention can be drawn directly for the production of strands, tubing, or fibers, these being used in optical-conductor applications. In one preferred embodiment, the TPUs of the invention are used in composite conductors which comprise the TPU of the invention in the form of optical conductors which preferably have a further layer (cladding layer) in order to improve total reflection within the optical conductor. In an embodiment to which more preference is given, the cladding layer can have a surrounding exterior layer for protection from mechanical damage.

The cladding layer is an additional layer on an optical conductor, in the present case on thermoplastic polyurethane, and this layer differs from the optical conductor in refractive index. Without the cladding layer, reflection at the boundary layer of the optical conductor would be determined by the refractive index difference between optical conductor and air, whereas with cladding layer the corresponding reflection behavior is determined by the ratio of the refractive index of optical conductor to that of the cladding layer. The difference in refractive index between optical conductor and cladding layer is particularly important when the optical conductor is flexed, since the angle up to which reflection of light takes place at the boundary layer depends on the difference in refractive indices. The refractive index of the core of an optical conductor is preferably more than 1.45, more preferably more than 1.5. The light is thus kept within the radii, and does not escape even when the optical conductor is subjected to curvature. As the difference in refractive index between optical conductor and cladding layer becomes higher, the extent of flexing to which the optical conductor can be subjected becomes greater. The difference in refractive indices between optical conductor and cladding layer is preferably more than 0.1, more preferably more than 0.15, and particularly preferably more than 0.2.

In another embodiment, the TPU of the invention can be used in a composite conductor which comprises a central electrical conductor, e.g. a copper wire, with an annular surrounding layer composed of optically conductive TPU of the invention, where the TPU annulus itself has a surrounding cladding layer. In an embodiment to which more preference is given, the cladding layer has a surrounding coating for protection from mechanical damage. Structures of this type are preferably suitable for the transmission of signals in automobiles.

A particular application of the materials of the invention, as optical conductors, is found in automobile construction, where there are transmission distances of from 3 to 5 m. Another conceivable application is in energy-supply systems whose parts have a high degree of freedom of movement, in particular when transmission distances are from 3 to 5 m. The flexible, transparent, optically conductive TPUs can be used here for the cladding of flexible energy cables. Possibilities within automobile applications are not only preventive detection of damage to lines having safety functions (ABS cables, brake hoses) but also rapid data transmission for purposes of control and measurement, without any interference voltages. An example of another application is a flexible system for instrument background lighting.

Suitable cladding layers are preferably fluoropolymers, fluorine-containing elastomers, and the polyurethane-siloxane copolymers known from U.S. Pat. No. 4,836,646.

EXAMPLES

1. Components

The following components are used in the examples below:

TABLE 1

| Product name | Key | Chemical constitution |
| --- | --- | --- |
| PTHF | B1 | Polytetrahydrofuran, number-average molar mass 1000 g/mol |
| B14 | KV1 | 1,4-Butanediol |
| 4,4'-MDI | A1 | Diphenylmethane diisocyanate |
| Antioxidant | E1 | Irganox 1125 (phenolic antioxidant) |
| Hydrolysis stabilizer | E2 | Polymeric carbodiimide as hydrolysis stabilizer |
| Polyesterdiol 1 | B2 | Hexanediol butanediol adipate, number-average molar mass 2000 g/mol |
| H12MDI | A2 | Perhydrogenated diphenylmethane diisocyanate |
| SDO | D1 | Stannous dioctoate as catalyst |
| TBOT | D2 | Titanium catalyst |
| Polyesterdiol 2 | B3 | Butanediol adipate, number-average molar mass 1000 g/mol |

2. Determination Methods

The thermoplastic polyurethane is used to extrude strands of diameter 2 mm, as optical conductors.

To determine light transmittance, the input end of the strands, i.e. the location where the light was incident on the optical conductor, was connected by way of a connecting sleeve to a "superbright white" LED (light emitting diode) (diameter 5 mm) or to a laser diode (LD). The design of the connection site here is such that the laser diode is in contact perpendicularly with that surface of the optical conductor cut perpendicularly to its axis. The end of the optical conductor is likewise chopped perpendicularly to the axis of the optical conductor. The light signal from the LED or the LD was thus input into, i.e. incident on, the test sections, i.e. optical conductors. Measurements were made using this method, i.e. direct incidence of the light signals from the LEDs or LDs, and a getSpec 2048 miniature spectrometer, in the range from 380 nm to 780 nm, and the following luminous power or illuminance:

| LED (white) | luminous power = 47 µW, illuminance = 1000 lux |
| Laser diode LD (red) | luminous power = 450 µW, illuminance = 3450 lux |

At the end of the test sample sections, i.e. the optical conductors made of thermo-plastic polyurethane of diameter 2 mm, there was an optical detector which had been connected by way of a commercial optical conductor (diameter 200 µm/placed centrally within the optical detector capsule) to the getSpec 2048 spectrometer. The length of the optical conductors tested was up to 8 m.

Total opacity was determined as follows:

Color-measurement equipment was used to measure the color of the test specimen, first using a light trap as background and then using a white tile as background, in reflection, with exclusion of specular reflection. Lightness (L value to DIN 6174) is calculated as a ratio and stated as opacity in %.

"UltraScan" color-measurement equipment from Hunter-Lab, or equivalent equipment, is used. The specimens are produced to AA E-10-132-002. The color measurement equipment is standardized on reaching the operating temperature, generally for a period of 30 minutes, and operated with the following parameters:

Mode: RSEX (Reflection Specular Excluded), reflection excluding specular reflection, with gloss trap open Area view: large Port size: 25.4

UV filter: out

The following formula is used to calculate total opacity:

Opacity=(L value, black/L value, white)×100%

An opacity value of 0% thus means complete transparency of the specimen, and a value of 100% means complete opacity.

Refractive index was determined using a refractometer and daylight-spectrum light.

3. General Specification for Process for Production of TPUs

The test extrudates were produced under the following conditions, with diameters of about 2 mm:

TABLE 2

| Extruder: | Co-rotating twin-screw extruder, APV MP19 |
| Temperature profile: | HZ1 (feed) from 175° C. to 185° C. |
| | HZ2 from 180° C. to 190° C. |
| | HZ3 from 185° C. to 195° C. |
| | HZ4 from 185° C. to 195° C. |
| | HZ5 (die) from 180° C. to 190° C. |
| Screw rotation rate: | 100 rpm |
| Pressure: | From about 10 to 30 bar |
| Extrudate cooling: | Water bath (10° C.) |

4. Specific Examples

The following TPUs were produced using the starting components identified above, in the stated process (data in g unless otherwise stated).

TABLE 3

| TPU | B1 | B2 | B3 | A1 | A2 | CE1 | E1 | E2 | D1 | D2 |
|---|---|---|---|---|---|---|---|---|---|---|
| TPU1 | 1000 | | | 650 | | 144 | 18 | | 2 ppm | |
| TPU2 | | 1000 | | 500 | | 88 | | 8 | 1 ppm | |
| TPU3 | | | 1000 | | 977.1 | 289.25 | | 8 | 200 ppm | |
| TPU4 | 1000 | | | | 1181 | 319.73 | | | | 25 ppm |

Where no unit is given for data in the table, the data are in grams [g].

Measurement of Possible Transmission Distance

Sample strands were used in the method stated above to transmit light from an LED and from an LD in the visible region of the spectrum, while detecting or determining the maximum possible transmission distance providing pulse-transmission adequate for the application.

TABLE 4

| TPU | RT (LED) | RT (LD) |
|---|---|---|
| TPU1 | 1.5 | 2.6 |
| TPU2 | 1.4 | 2.5 |
| TPU3 | 2.9 | 4.0 |
| TPU4 | 4.0 | 6.0 |

RT: maximum relative transmission disturbance [m] permitting pulse transmission which is adequate for the application The light sources used were as follows:

| LED (white) | luminous power 47 µW, illuminance 1000 lux |
| Laser diode LD (red) | luminous power 450 µW, illuminance 3450 lux |

We claim:

1. An optically conductive element in an optical conductor, comprising an optically conductive thermoplastic polyurethane comprising
   A) a diisocyanate which comprises 1-isocyanato-4-[(4-isocyanatocyclohexyl)methyl] cyclohexane
   B) a polyol which is polytetrahydrofuran having an average molecular weight from 600 to 2000
   C) a isocyanate-reactive chain extender which is 1,4-butanediol,
   D) an optional catalyst, and
   E) optional auxiliaries in an amount of at most 0.1% by weight based on the total amount of components A) through E), wherein components B) and C) are the only isocyanate-reactive components, wherein, in the thermoplastic polyurethane,
- a) the content of aromatics and of conjugated π-electron systems is at most 40% by weight, based on the thermoplastic polyurethane inclusive of any additives present,
- b) the refractive index of the thermoplastic polyurethane is at least 1.50, and
- c) total opacity is smaller than 10%, and wherein said optically conductive thermoplastic polyurethane is obtained by a one-shot process, in which reaction begins upon mixing components A) through E), the reaction being conducted at a temperature of from 140 to 280° C.

2. A process for the production of optical conductors, which comprises using, as optically conductive material, an optically conductive thermoplastic polyurethane comprising
- A) a diisocyanate which comprises 1-isocyanato-4-[(4-isocyanatocyclohexyl)methyl] cyclohexane
- B) a polyol which is polytetrahydrofuran having an average molecular weight from 600 to 2000
- C) a isocyanate-reactive chain extender which is 1,4-butanediol,
- D) an optional catalyst, and
- E) optional auxiliaries in an amount of at most 0.1% by weight based on the total amount of components A) through E), wherein components B) and C) are the only isocyanate-reactive components, wherein, in the thermoplastic polyurethane,
- a) the content of aromatics and of conjugated π-electron systems is at most 40% by weight, based on the thermoplastic polyurethane inclusive of any additives present,
- b) the refractive index of the thermoplastic polyurethane is at least 1.50, and
- c) total opacity is smaller than 10%, and wherein said optically conductive thermoplastic polyurethane is obtained by a one-shot process, in which reaction begins upon mixing components A) through E), the reaction being conducted at a temperature of from 140 to 280° C.

3. A process for the production of an optically conductive element in an optical conductor comprising an optically conductive thermoplastic polyurethane comprising
- A) a diisocyanate which comprises 1-isocyanato-4-[(4-isocyanatocyclohexyl)methyl] cyclohexane
- B) a polyol which is polytetrahydrofuran having an average molecular weight from 600 to 2000
- C) a isocyanate-reactive chain extender which is 1,4-butanediol,
- D) an optional catalyst, and
- E) optional auxiliaries in an amount of at most 0.1% by weight based on the total amount of components A) through E), wherein components B) and C) are the only isocyanate-reactive components, wherein, in the thermoplastic polyurethane,
- a) the content of aromatics and of conjugated π-electron systems is at most 40% by weight, based on the thermoplastic polyurethane inclusive of any additives present,
- b) the refractive index of the thermoplastic polyurethane is at least 1.50, and
- c) total opacity is smaller than 10%, and wherein said optically conductive thermoplastic polyurethane is obtained by a one-shot process, in which reaction begins upon mixing components A) through E), the reaction being conducted at a temperature of from 140 to 280° C., comprising mixing components A) through E), and reacting components A) through C) by a one-shot process and at a temperature of from 140 to 280° C., wherein
- an equivalence ratio of NCO groups to the entirety of the isocyanate-reactive groups of from 0.9:1.0 to 1.2:1.0
- no scattering centers are introduced
- and essentially no components which absorb UV radiation and/or VIS radiation are introduced.

4. The optically conductive element according to claim 1, wherein the content of said aromatics and of said conjugated π-electron systems is at most 25% by weight.

5. The optically conductive element according to claim 1, wherein the content of said aromatics and of said conjugated π-electron systems is at most 10% by weight.

6. The optically conductive element according to claim 1, wherein the refractive index of the thermoplastic polyurethane is at least 1.52.

7. The optically conductive element according to claim 1, wherein total opacity of said thermoplastic polyurethane is smaller than 7%.

8. The optically conductive element according to claim 1, wherein in said process,
- an equivalence ratio of NCO groups to the entirety of the isocyanate-reactive groups of from 0.9:1.0 to 1.2:1.0,
- no scattering centers are introduced,
- and essentially no components which absorb UV radiation and/or VIS radiation are introduced.

9. The optically conductive element according to claim 1, wherein component E) is not present.

10. The optically conductive element in an optical conductor according to claim 1, wherein said optically conductive element is in at least one form selected from the group consisting of a strand, a tube and a fiber.

11. The optically conductive element in an optical conductor according to claim 1, wherein said optically conductive element is capable of a transmission distance of at least 3 m.

* * * * *